J. O. BELKNAP.
Signal-Lanterns.
No. 149,826.  Patented April 21, 1874.
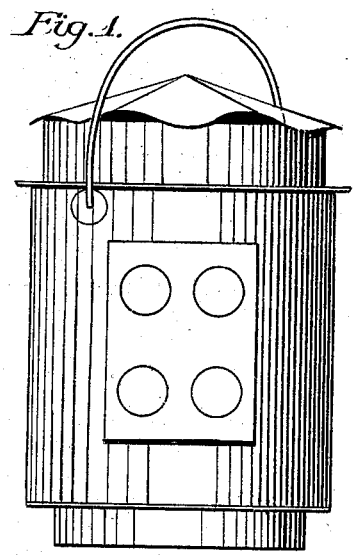
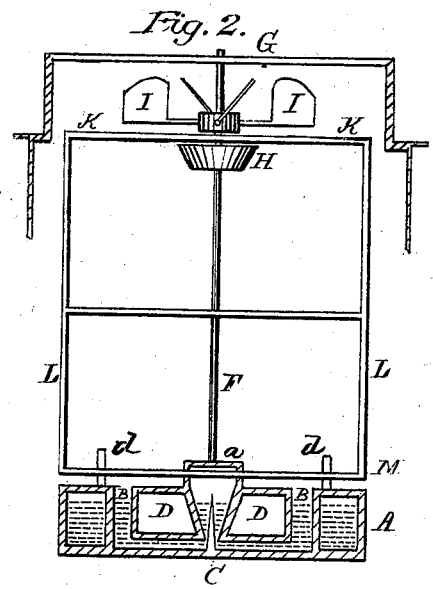
WITNESSES.  INVENTOR.

UNITED STATES PATENT OFFICE.

JACKSON O. BELKNAP, OF MOBILE, ALABAMA.

IMPROVEMENT IN SIGNAL-LANTERNS.

Specification forming part of Letters Patent No. 149,826, dated April 21, 1874; application filed March 31, 1873.

*To all whom it may concern:*

Be it known that I, JACKSON OGDEN BELKNAP, of Mobile, county of Mobile, State of Alabama, have invented a novel Improvement in Railroad and Marine Signal-Lights, of which the following is a specification:

The object of this invention is to furnish railroad companies, steamers, and other vessels, as also light-houses, with a novel and useful improvement, to be used for the purpose of signaling, by the exhibition of any combination of colors in various ways desired, which is described as follows:

In the drawings, Figure 1 is a front elevation, and Fig. 2 a vertical section, omitting part of the outer casing.

A is a lamp, of metal, glass, gutta-percha, or any other suitable material, or any shape, having a hollow opening or basin in the center, circular or otherwise, which may be the same depth and height, or deeper and higher than the lamp, which opening is a reservoir, B, with a bottom water-tight, in the center of which is a spindle, C, of metal or other material, secured vertically. Around the reservoir B, on the top side of the lamp A, is arranged one or more burners, d, of any sort required, communicating with the burning fluid in the lamp. D is a light water-tight float, of metal, glass, or gutta-percha, or other material, of circular or other form, having a tube, a, tapering or otherwise, passing through from top to bottom, the lower end of a having a small hole, just large enough to allow the vertical spindle C to enter freely. F is a shaft, solid or hollow, which is attached in any way to the top of the float D, which is inserted into the reservoir B, with the spindle C entering into the hole prepared for it in the lower end of tube a in the float. Across the top of the lantern, at a suitable distance above the burners, is a cross-piece of metal, G, having a hole or opening through it exactly above the center of the float, so that the shaft F will stand in a perfectly vertical position. A cone or other shaped reflector or shield, H, is attached to the shaft F at a suitable point above the burners of the lamp, to the outer edges of which are attached reversible fans or wings I, so arranged as to receive the pressure of the rising column of heat from the burners below. Attached also to the shaft F is a cylinder, L, of mica or other suitable material, having upon its surface any arrangement of transparent and opaque zones, bands, &c., by staining glass, mica, or gelatine-board, or any other suitable material, to express intelligence on railroads, vessels of all kinds, light-house stations, &c. Ordinary glass or convex lenses and reflectors of any design, in combination with the colors and opaque zones, are to be used in this invention for the purpose stated. Suitably made, one above another, to the side or proper part of the lantern, may be any desired number of openings, covered with glass or lenses, arranged in any form desired, so that the combination of colors and opaque zones upon the revolving cylinder, inside the lantern, while passing the openings, exhibit whatever color is between them and the light, which will have the effect of showing two or more colors at the same time, and others of an entirely different appearance in the same places in a few seconds afterward, which is effected by the rising column of heated air from the lamp-burners, and operating upon the fans or wings I, attached to the shaft F, which revolves, carrying with it the cylinder K, with colors, &c., the reservoir B having been first charged with water or other liquid, in which the float D revolves, sustaining the weight of whatever is attached thereto, and through the power of heat stated, produces the results desired. Letters and various characters may be exhibited in the same way by cutting them out of metal, (as in stencil-work,) placing them before a glass opening in the lantern, so that when the cylinder revolves the letters or inscriptions will change colors as it passes over the open-cut letters; the same thing may be done with the openings for signaling purposes, in which case it will only be necessary to have a number of metal or other opaque plates or panels, with the openings arranged as desired, cut through them, and arranged upon the lantern as slides, which may be more easily managed by being permanently attached. A cover may be put on the reservoir, which will protect the water and float from dirt of any kind, having an opening in the center for the shaft to revolve, also an opening to allow the reservoir to be replenished with water when necessary, and a stopper or cap to secure it.

Where this device is used upon stationary lanterns out of doors, a conductor-pipe may be so attached from the roof as to direct the water into the reservoir whenever it rains. In winter a small jet of light may be introduced under the reservoir to thaw the ice which may have formed during the day.

It will readily be perceived that this revolving device has little or no friction, (being entirely afloat,) and moved by the least breath of air. It cannot get out of order, consequently needs no repairs, and so long as the reservoir is charged with water or other liquid the apparatus can be moved by the slightest power applied.

If desirable, the illuminating-lamps may be entirely independent of the propelling-lamps. The latter can be arranged under the lantern, and conductor-pipes arranged to take the heat up to act upon the fans or wings.

Where this invention is to be applied to large-sized lanterns or light-houses, the revolving cylinder of colors may rest upon the float by proper attachments, leaving ventilation under it for the lamps, which may really be a part of the float itself, and the whole thing revolve together, a suitable bearing fixed in the upper part of the lantern to keep it steady and vertical.

The described apparatus, floating, may be moved by clock-work, windmills, cranks, and cogs, or various other appliances.

Having described my invention, what I claim as new, and desire to secure by Letters Patent, is—

1. The rotating lantern-frame, resting upon liquid, and arranged to be operated by the ascending current of heated air from the burners A A striking the wings I I of the fan-wheel.

2. The combination of the floats D D, shaft F, and fan-wheel M, operated by a current of hot air from a lamp, or equivalent.

J. O. BELKNAP.

Witnesses:
 C. H. POOLE,
 A. F. DINSMORE.